(12) United States Patent
Brinkmann

(10) Patent No.: US 11,734,017 B1
(45) Date of Patent: Aug. 22, 2023

(54) METHODS AND SYSTEMS FOR PROCESSING VEHICLE SENSOR DATA ACROSS MULTIPLE DIGITAL SIGNAL PROCESSING CORES VIRTUALLY ARRANGED IN SEGMENTS BASED ON A TYPE OF SENSOR

(71) Applicant: Waymo LLC, Mountain View, CA (US)

(72) Inventor: Peter Brinkmann, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 181 days.

(21) Appl. No.: 17/113,470

(22) Filed: Dec. 7, 2020

(51) Int. Cl.
*G06F 9/38* (2018.01)
*G06F 9/30* (2018.01)
(Continued)

(52) U.S. Cl.
CPC .......... *G06F 9/3891* (2013.01); *G01S 13/931* (2013.01); *G06F 9/30079* (2013.01);
(Continued)

(58) Field of Classification Search
CPC ............... G06F 9/3891; G06F 9/30079; G06F 9/30087; G06F 9/345; G06F 9/4812; G06F 9/4881; G06F 9/5077; G01S 13/931
See application file for complete search history.

(56) References Cited

U.S. PATENT DOCUMENTS 5,524,258 A * 6/1996 Corby, Jr. ........... G06F 15/8007
712/19
7,490,221 B2 2/2009 Evans
(Continued)

FOREIGN PATENT DOCUMENTS

CN 102752198 B 10/2014
CN 105528253 A 4/2016
(Continued)

OTHER PUBLICATIONS

Liu et al., "CAAD: Computer Architecture for Autonomous Driving", IEEE (2017).

*Primary Examiner* — Michael W Ayers
(74) *Attorney, Agent, or Firm* — McDonnell Boehnen Hulbert & Berghoff LLP

(57) ABSTRACT

Example embodiments relate to scheduling and processing sensor data across multiple digital signal processing (DSP) cores. A system may include DSP cores that are virtually arranged into a first segment and a second segment, each with DSP cores arranged in a linear order. The system may process sensor data using the DSP cores and a processing pipeline. DSP cores from the first segment are configured to initiate processing a first stage sequentially based on the linear order until all DSP cores are processing portions in parallel, collate outputs to produce a first stage output, and provide a first signal to the second segment based on producing the first stage output. Responsive to receiving the first signal, DSP cores from the second segment are configured to initiate processing the second stage sequentially based on the linear order until all DSP cores are processing portions in parallel, collate outputs to produce a second stage output, and provide a second signal based on producing the second stage output. The system may provide instructions
(Continued)

based on a combination of the first stage output and the second stage output.

20 Claims, 11 Drawing Sheets

(51) Int. Cl.
  *G06F 9/345* (2018.01)
  *G01S 13/931* (2020.01)
  *G06F 9/50* (2006.01)
  *G06F 9/48* (2006.01)

(52) U.S. Cl.
  CPC .......... *G06F 9/30087* (2013.01); *G06F 9/345* (2013.01); *G06F 9/4812* (2013.01); *G06F 9/4881* (2013.01); *G06F 9/5077* (2013.01)

(56) References Cited

U.S. PATENT DOCUMENTS

| | | | |
|---|---|---|---|
| 8,909,902 | B2 | 12/2014 | Latorre |
| 9,384,009 | B2 | 7/2016 | Belmont |
| 10,168,691 | B2 | 1/2019 | Zornio |
| 10,277,913 | B2 | 4/2019 | Kwon |
| 10,546,211 | B2 | 1/2020 | Shacham |
| 2011/0231616 | A1 | 9/2011 | Lin |
| 2013/0326193 | A1* | 12/2013 | McCarthy ............. G06F 12/023 712/E9.016 |
| 2014/0292559 | A1* | 10/2014 | Asanuma ............... G01S 13/345 342/133 |
| 2014/0317380 | A1* | 10/2014 | Yamamoto ............ G06F 9/4881 712/30 |
| 2015/0304679 | A1 | 10/2015 | Pasupuleti |
| 2016/0275123 | A1* | 9/2016 | Lin ....................... G06F 9/5083 |
| 2017/0083336 | A1 | 3/2017 | Lu |
| 2019/0384303 | A1* | 12/2019 | Muller .................. G05D 1/027 |
| 2022/0126864 | A1* | 4/2022 | Moustafa ........... B60W 60/001 |
| 2022/0146664 | A1* | 5/2022 | Ichiki .................... G01S 13/867 |

FOREIGN PATENT DOCUMENTS

| | | | |
|---|---|---|---|
| CN | 103838552 | B | 6/2016 |
| CN | 106227591 | B | 10/2019 |

* cited by examiner

METHODS AND SYSTEMS FOR PROCESSING VEHICLE SENSOR DATA ACROSS MULTIPLE DIGITAL SIGNAL PROCESSING CORES VIRTUALLY ARRANGED IN SEGMENTS BASED ON A TYPE OF SENSOR

BACKGROUND

A sensor system may include several different types of sensors, such as image capture systems (e.g., cameras), radars, and/or light detection and ranging (LIDAR or Lidar) systems. Such sensor systems may be utilized, for example, in conjunction with autonomous or semi-autonomous robots and/or vehicles (e.g., self-driving cars/trucks).

In some cases, a sensor system may use a digital signal processor (DSP) to process incoming sensor data. A DSP is a specialized microprocessor chip with architecture optimized for the operational needs of digital processing. DSPs are typically fabricated on MOS integrated circuit chips and can be used in audio signal processing, telecommunications, digital image processing, and sensor data processing as well other types of operations. As such, the sensor system may use the DSP to measure, filter, and/or compress continuous real-world analog signals. One challenge with these types of sensor systems is processing large amounts of incoming sensor data with adequate time to determine strategies based on changes detected within the data.

SUMMARY

The present disclosure generally relates to techniques for scheduling and processing workloads across multiple DSP cores. A vehicle sensor system may use example techniques described herein to efficiently process data pipeline workloads (e.g., radar and other types of sensor data) in real-time to understand the environment during autonomous operation.

In one embodiment, the present application describes a method. The method involves receiving, at a computing system and from a sensor coupled to a vehicle, sensor data representing an environment of the vehicle. The computing system includes a plurality of digital signal processing (DSP) cores and a processing pipeline for the sensor data includes a first stage and a second stage. The plurality of DSP cores are virtually arranged into a first segment and a second segment such that each segment includes one or more DSP cores arranged in a linear order. The method further involves processing, by the computing system, the sensor data using the plurality of DSP cores and the processing pipeline. DSP cores from the first segment are configured to: (i) initiate processing the first stage sequentially based on the linear order until all DSP cores are processing portions of the first stage in parallel, (ii) collate outputs from each DSP core to produce a first stage output, and (iii) provide a first signal to the second segment based on producing the first stage output. Responsive to receiving the first completion signal from the first segment, DSP cores from the second segment are configured to: (i) initiate processing the second stage sequentially based on the linear order until all DSP cores are processing portions of the second stage in parallel, (ii) collate outputs from each DSP core to produce a second stage output, and (iii) provide a second signal based on producing the second stage output. The method further involves receiving, at the computing system, the second signal from the second segment and, responsive to receiving the second completion signal, providing instructions to the vehicle based at least in part on a combination of the first stage output and the second stage output.

In another embodiment, the present application describes a system. The system may include a computing device having a plurality of DSP cores that are virtually arranged into a first segment and a second segment such that each segment includes one or more DSP cores arranged in a linear order. The computing device is configured to receive, from a sensor coupled to a vehicle, sensor data representing an environment of the vehicle. A processing pipeline for the sensor data includes a first stage and a second stage. The computing device is further configured to process the sensor data using the plurality of DSP cores and the processing pipeline. DSP cores from the first segment are configured to: (i) initiate processing the first stage sequentially based on the linear order until all DSP cores are processing portions of the first stage in parallel, (ii) collate outputs from each DSP core to produce a first stage output, and (iii) provide a first signal to the second segment based on producing the first stage output. Responsive to receiving the first completion signal from the first segment, DSP cores from the second segment are configured to: (i) initiate processing the second stage sequentially based on the linear order until all DSP cores are processing portions of the second stage in parallel, (ii) collate outputs from each DSP core to produce a second stage output, and (iii) provide a second signal based on producing the second stage output. The computing device is further configured to receive the second signal from the second segment and, responsive to receiving the second signal, provide instructions to the vehicle based at least in part on a combination of the first stage output and the second stage output.

In yet another example, the present application describes a non-transitory computer-readable medium configured to store instructions, that when executed by a computing system comprising one or more processors, causes the computing system to perform operations. The operations may involve one or more functions of the method described above.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
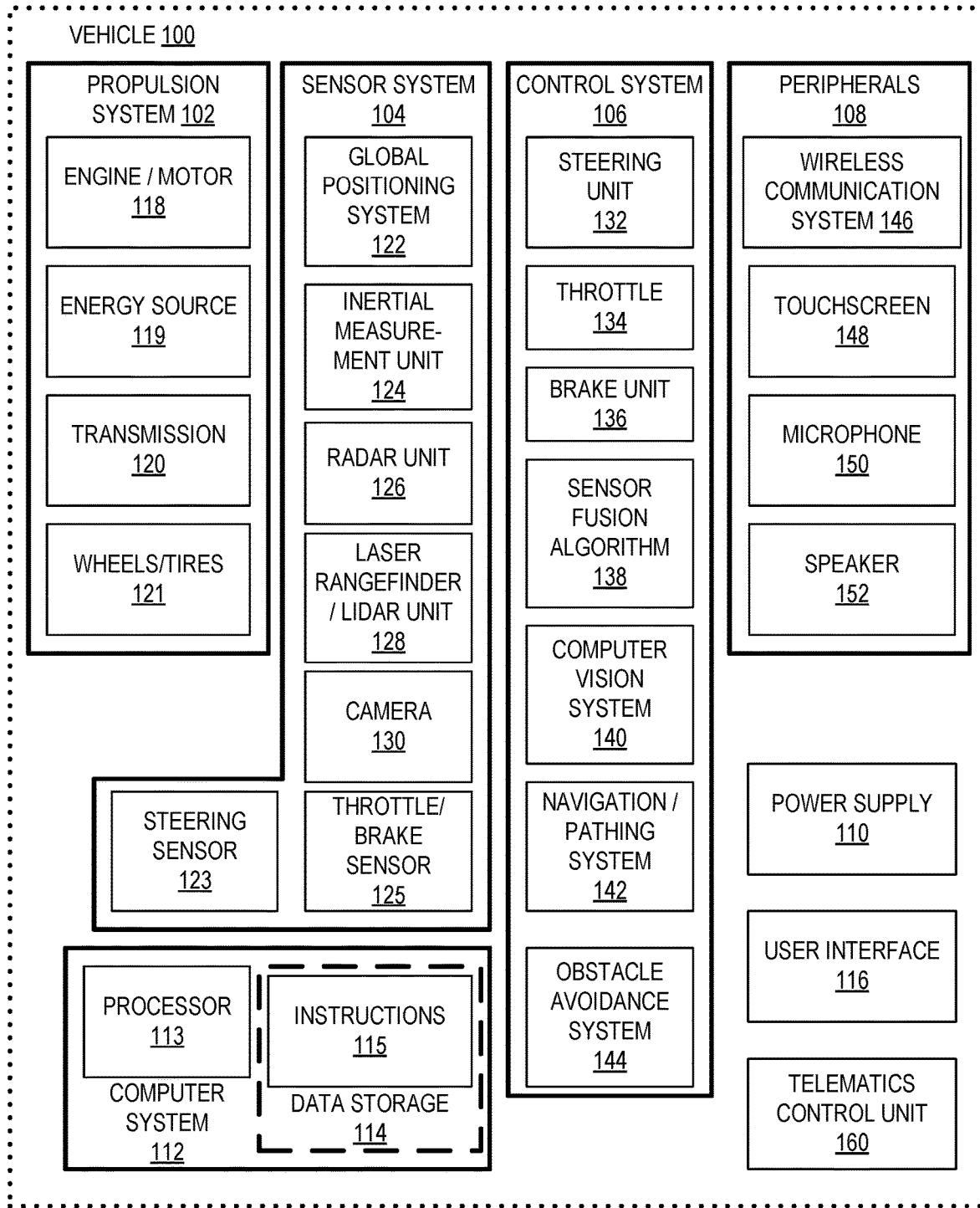
FIG. 1 is a functional block diagram illustrating a vehicle, according to one or more example embodiments.
Figure 2A:
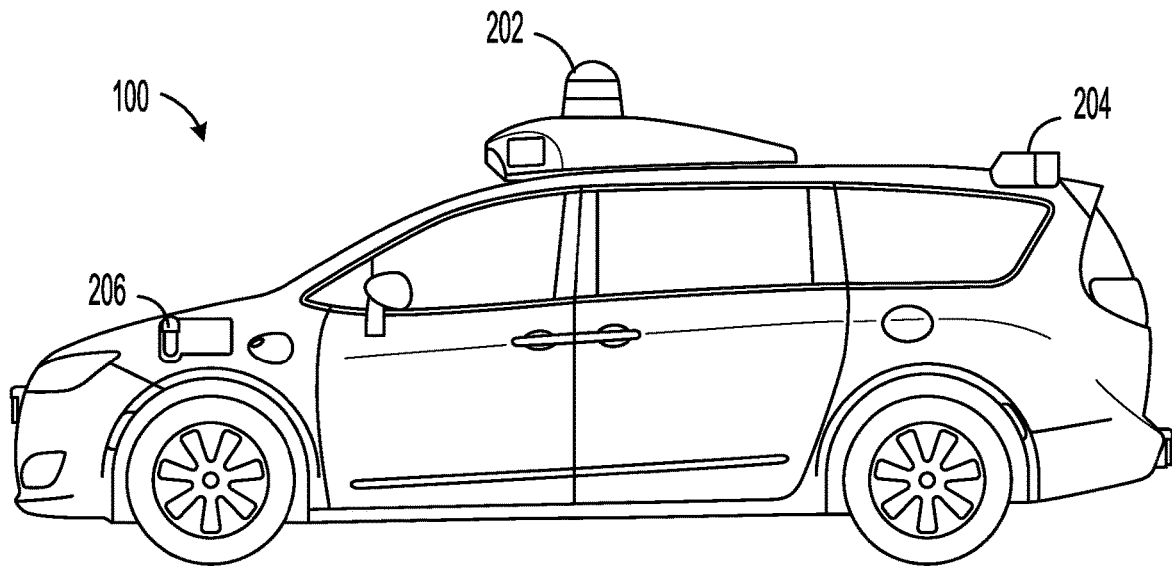
FIG. 2A illustrates a side view of a vehicle, according to one or more example embodiments.
Figure 2B:
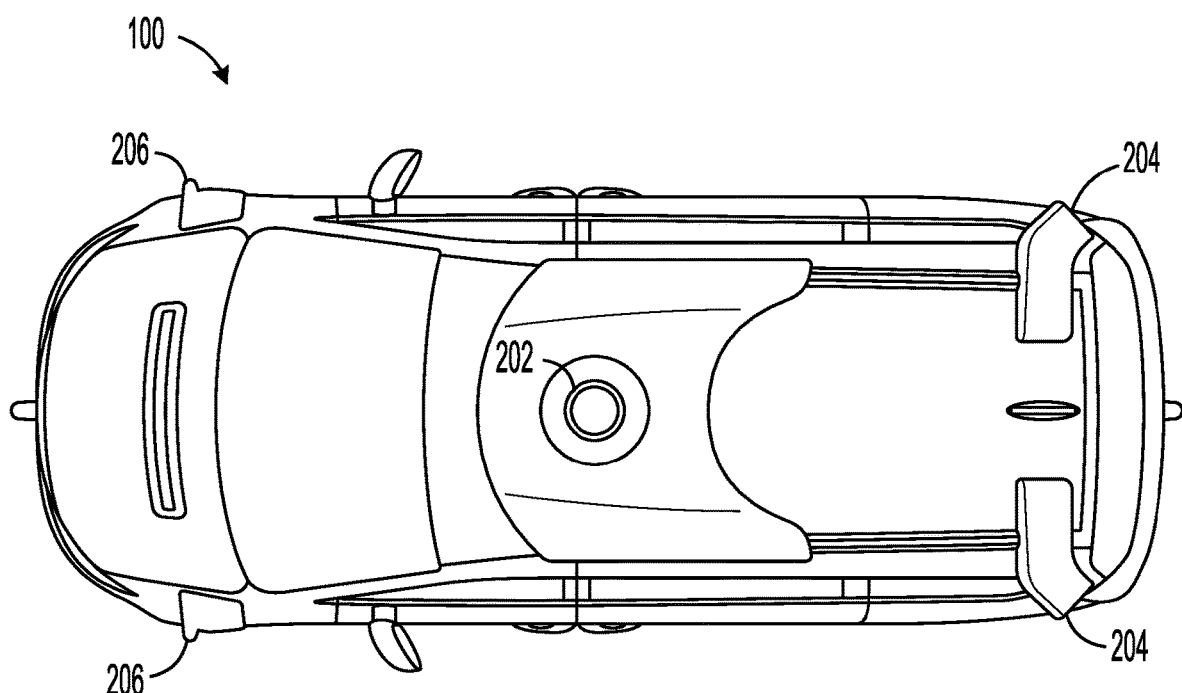
FIG. 2B illustrates a top view of a vehicle, according to one or more example embodiments.
Figure 2C:
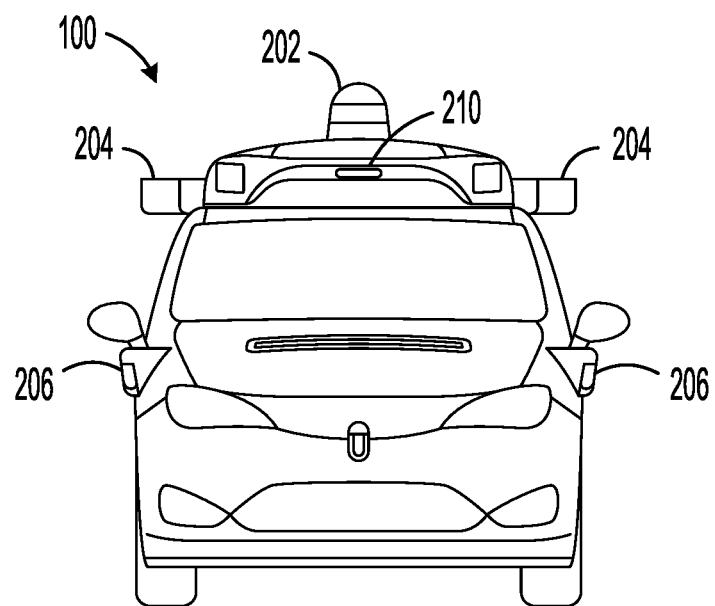
FIG. 2C illustrates a front view of a vehicle, according to one or more example embodiments.
Figure 2D:
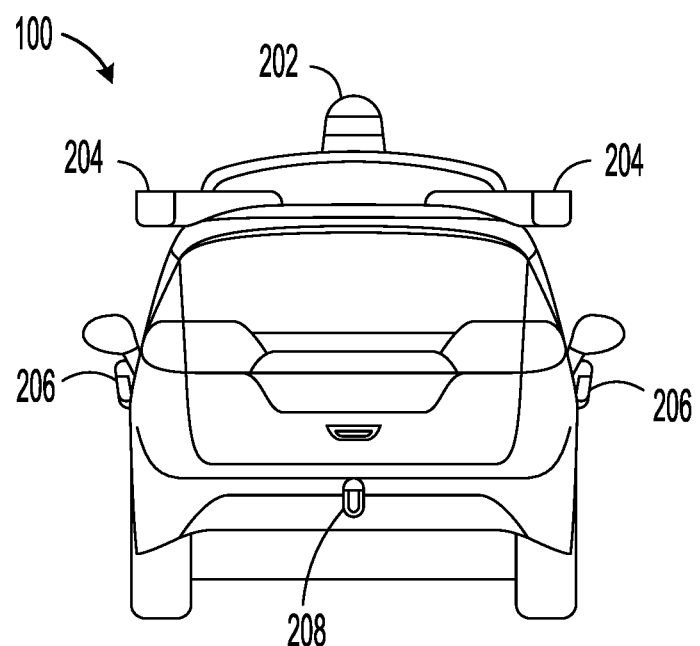
FIG. 2D illustrates a back view of a vehicle, according to one or more example embodiments.
Figure 2E:
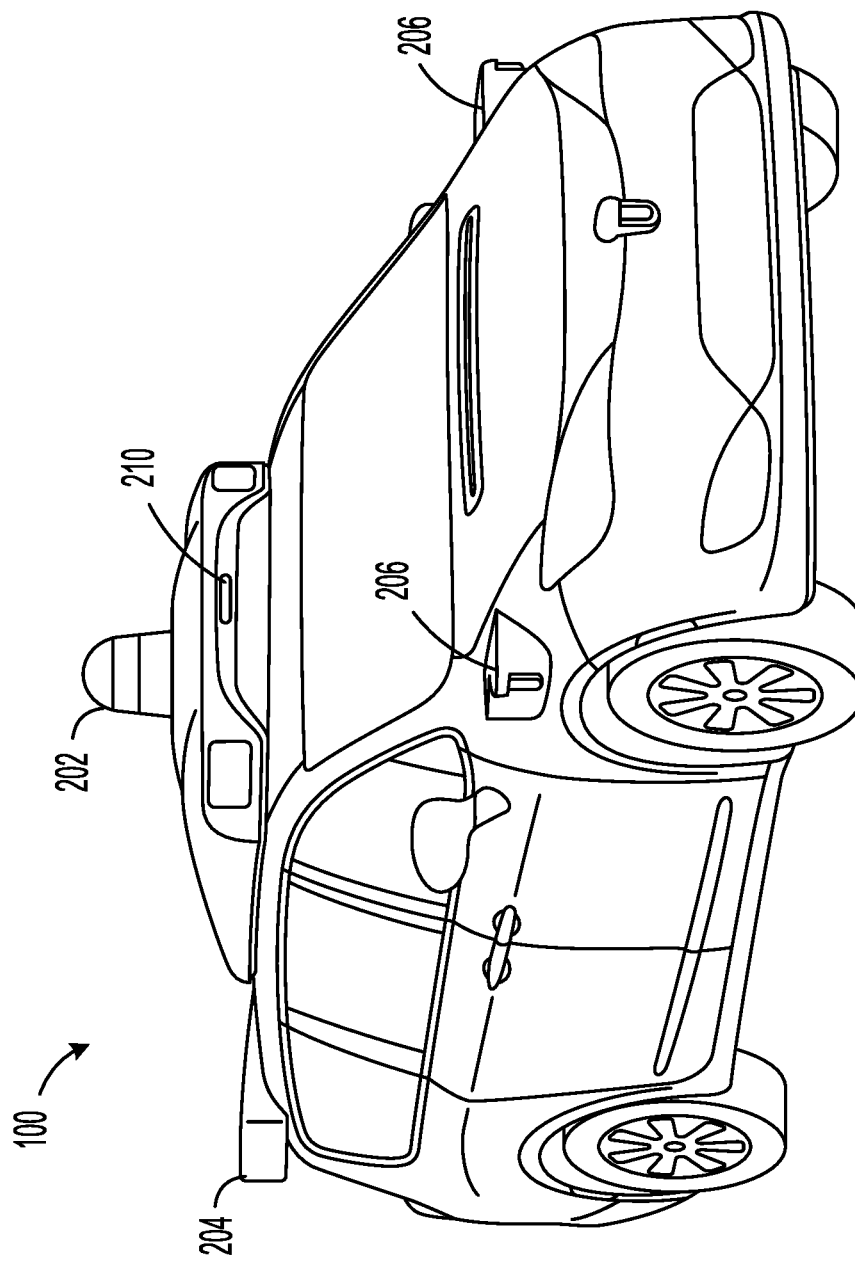
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Digital signal processing (DSP) algorithms typically involve executing a large number of mathematical operations quickly and repeatedly on a series of data samples. For example, sensor data and other signals can be converted from analog to digital, manipulated digitally, and then converted back to analog form. Some DSP applications include audio signal processing, audio compression, digital image processing, video compression, speech processing, speed recognition, digital communications, digital synthesizers, radar, sonar, financial signal processing, seismology, and biomedicine, among others.

An autonomous vehicle may utilize one or more DSP algorithms to perform operations to enable safe navigation. For example, a vehicle sensor processing system may use DSP to efficiently process incoming sensor data and map the surrounding environment. Because the vehicle's environment can rapidly change, it is beneficial to provide the vehicle navigation system with a clear, real-time understanding of the environment in order to detect potential obstacles and determine safe navigation strategies. In addition, many vehicle sensor systems have numerous sensors measuring different aspects of the environment simultaneously. Therefore, it is advantageous for vehicle systems to be able to process and use large amounts of sensor data measuring aspects of the environment to gain this understanding.

Example embodiments presented herein involve efficiently scheduling and processing sensor data and other types of data across multiple DSP cores. In some embodiments, a sensor system may use one or more DSP techniques described herein to efficiently process incoming sensor data received from one or more sensors in real-time. For example, a computing device may use the DSP processing technique to generate and continuously update a map of the environment surrounding the vehicle that can be used to determine safe navigation strategies as vehicle sensors provide new sets of data. Within examples, the computing device or computing devices performing the sensor processing using the DSP technique(s) may be located onboard the vehicle, located remotely from the vehicle, and/or a combination of devices located onboard and remotely engaging in wireless communication.

In other embodiments, computing devices may use the DSP techniques to efficiently process data for other applications. For example, a system may use the scheduling and processing operations described herein for Monte Carlo simulations, transactional calculations, and other potential data manipulation and evaluation. Systems can use the techniques presented herein to process pipelines of data efficiently.

The scheduling and processing techniques described herein may be performed by one or more computing devices. A system may include multiple processing units (e.g., DSP cores) capable of performing operations described herein. In some examples, the computing device or system performing techniques described herein may include dozens of DSP cores (e.g., 24 cores) that can be utilized to process data efficiently. For example, a vehicle radar system may include multiple chips for radar processing with each chip configured with 24 DSP cores. The various chips can be connected together to form a global system that operates on the vehicle. In some applications, these DSP cores can be spread across multiple devices operating in a network. In addition, the computing device or devices configured to perform DSP scheduling and processing operations can be specialized devices configured for specific tasks, such as sensor data processing, perception, and/or navigation strategy planning. The DSP processing techniques can also be combined with other processing techniques (e.g., sensor fusion techniques) in a series and/or parallel.

To initiate scheduling and processing, a computing device may be initially configured to obtain some sort of data for processing. The configuration process may involve virtually dividing the DSP cores into different sets (i.e., segments) based on parameters of the data that will be processed. The arrangement of the DSP cores into segments may be done in advance when the partition of incoming data is known in advance. For instance, DSP cores may be virtually arranged by the computing device based on the specific jobs that the computing device is configured to complete. In some examples, the computing device may use a neural network to learn how to partition a particular set of data (e.g., sensor data from one or more sensors). In such cases, the DSP core arrangement can be based on the output from the neural network.

Each segment (i.e., set) can include one or more DSP cores (or other types of processing units) virtually assigned to that segment and arranged in a linear order within the segment (i.e., first core, second core, etc.) for executing processing tasks. For instance, a segment with three DSP cores could be arranged with a first DSP core, a second (i.e., middle) DSP, and a third (i.e., final) DSP arranged consecutively. The quantity of segments and quantity of cores within each segment can vary within embodiments. In some instances, the number of DSP cores within each segment can differ. In addition, a system may adjust the virtual arrangement of cores when processing different tasks.

In some embodiments, a host (e.g., a core or a specific processing unit) associated with the computing device may virtually organize the DSP cores into segments depending on one or more parameters of the data jobs that require some form of processing (e.g., a quantity of stages associated with each job). A job may consist of input data (e.g., sensor data), an algorithm to apply to the data (firmware), and a configuration that sets up the firmware to indicate how to process the input data. When the job relates to radar data, the algorithm may include multiple fast Fourier transforms (FFTs) and the configuration structure may specify information to the firmware, such as the dimensions of the input data and the location of memory buffers where to write the output. The input data may originate at a hardware interface (e.g., a sensor beyond the control of the firmware). As such, the firmware may be the same for all jobs.

As an example, when a data job is a sensor data pipeline with multiple stages, a host processing unit at the computing device (e.g., a processor, microprocessor, or DSP core) may have the DSP cores virtually arranged into a quantity of segments that matches the quantity of stages to create a 1-to-1 relationship between stages and segments. This arrangement can enable each segment to process a single stage for each data processing job. As such, a workload with multiple stages can be assigned to disjoint segments thereby enabling multiple workloads to be processed in a pipelined fashion. In particular, each segment of cores can process a given stage from each workload.

The scheduling algorithm utilized by the computing device can involve using two external callbacks on the DSP cores, which can be triggered by separate interrupts (e.g., one interrupt to signal the start of processing and a second interrupt to signal completion of a computation). For instance, to start a computation, a host may write the address of the data pipeline configuration (e.g., the dimensions of the input data and location of memory buffers) to a register of the first core of the first segment and also trigger a first interrupt at the first core. As a result of the first interrupt, each core in the first segment may wake up the next core according to the linear arrangement (except for the last core of the segment, which doesn't have a successor) before processing a slice of the job (e.g., the first stage). For example, the first core may trigger the second core prior to initiating the processing of a portion of the first stage of data. The second core, upon receiving the trigger from the first core, may trigger the next core (i.e., the third core) prior to initiating the processing of a different portion of the first stage of data. This consecutive wake up process can be executed across the DSP cores within a segment according to the linear order until reaching the end core.

As such, the processing of each stage can be executed in a callback that may run in parallel on all cores within the segment processing a stage. For example, when the first core is done processing its portion of the first stage of the job, the first core can be configured to invoke a completion callback before triggering a second interrupt (the completion interrupt) of its successor (i.e., the second core). The successor (i.e., the second core) can then invoke its completion callback before triggering the completion interrupt of its successor (i.e., the third core) and so on, until the completion interrupt of the last core within the segment is triggered. The last core of the segment can trigger the first interrupt of the next segment (if there is a next segment) or notify the host (if there is no next segment). When there is a next stage for the job, the first core of the next segment may perform a similar process upon receiving an interrupt from the last core of the prior segment. The cores within this next segment can process the second stage while the cores within the prior segment are able to start processing a new job. As a result, the collection of cores can process data pipelines efficiently. If an error occurs anywhere during processing, cores can stop processing and the host may be notified.

In some embodiments, each core can include a special register that indicates its global state. For example, a value of 0 can mean that the core has not started processing data and a value of 1 can mean that the core is ready to process requests. In addition, a negative value may indicate that processing has stopped with an error code.

A computing device or network of computing devices can achieve additional efficiency processing large amounts of data using all or a subset of the above techniques. In particular, processing callbacks can run concurrently (which is useful for breaking down large workloads) while the completion callbacks (signals) can run sequentially (which is useful for collating results across cores). The scheduling and processing techniques can enable processing data effectively in real-time to obtain outputs that can be used for other operations (e.g., environment perception and/or determination of vehicle navigation strategies).

When a core receives a start interrupt, the core initially wakes the following core (if the segment includes another core) and then processes its portion of the input, which enables the bulk of the work to be done in parallel. When a core receives a completion interrupt, the core may append its output to the output of previous cores and then trigger the completion interrupt of its successor (or the start interrupt of the next stage), which enables results to be collated sequentially. In such a configuration, the two interrupts convey information in a simple way. When a core receives the start interrupt, the core is able to process because the interrupt indicates that the prior cores are operating correctly and the input is ready for the core to process. When a core receives a completion interrupt, the core is able to execute accordingly because the completion interrupt conveys that the prior cores successfully operated and their outputs are done. The process can be repeated as new data sets are obtained for processing.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include one or more processors 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

Figure 3:
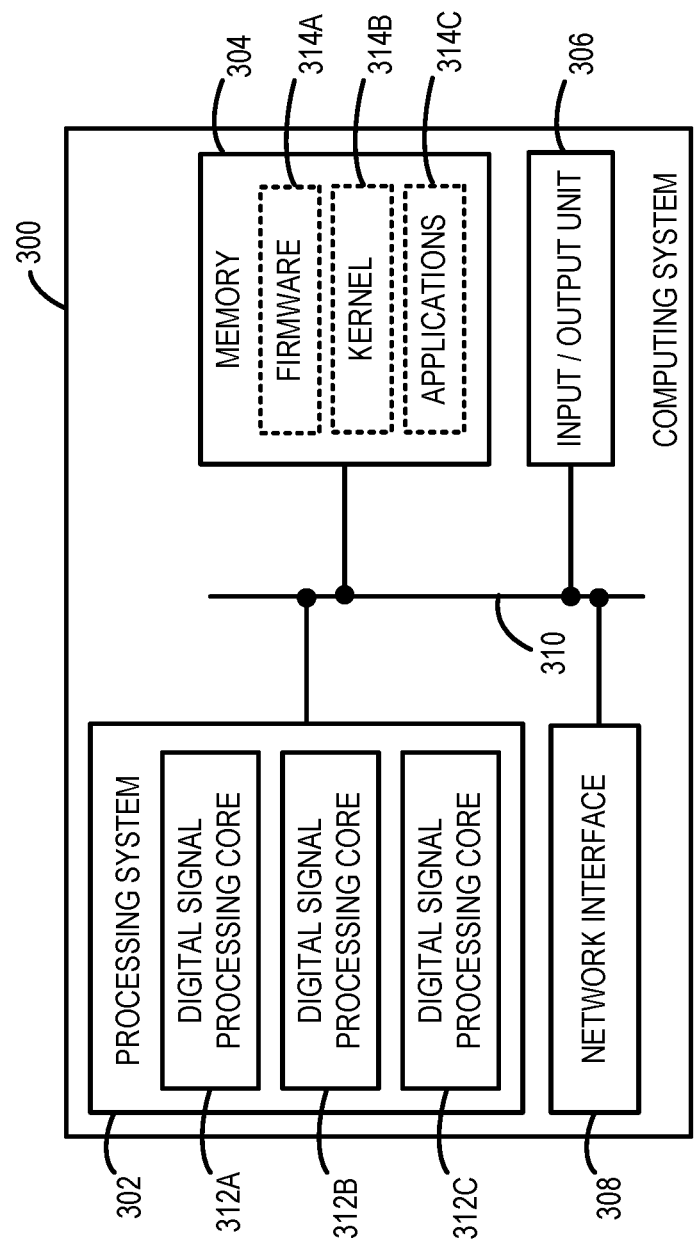
FIG. 3 is a simplified block diagram for a computing system, according to one or more example embodiments.

FIG. 3 is a simplified block diagram exemplifying computing system 300, illustrating some of the components that could be included in a computing device arranged to operate in accordance with the embodiments herein. Computing system 300 could be a client device (e.g., a device actively operated by a user), a server device (e.g., a device that provides computational services to client devices), or some other type of computational platform. In some embodiments, computing system 300 may be implemented as computer system 112, which can be located on vehicle 100 and perform processing operations related to vehicle operations. For example, computing system 300 can be used to process sensor data received from sensor system 104. Alternatively, computing system 300 can be located remotely from vehicle 100 and communicate via wireless communication.

In the example embodiment shown in FIG. 3, computing system 300 includes processing system 302, memory 304, input/output unit 306 and network interface 308, all of which may be coupled by a system bus 310 or a similar mechanism. In some embodiments, computing system 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

In some embodiments, processing system 302 is a multi-core processor equipped with multiple DSP cores. A multi-core processor is a computer processor integrated circuit with two or more separate processing units (e.g., cores), each of which reads and executes program instructions, as if the computer had several processors. The instructions are ordinary CPU instructions (e.g., add, move data, and branch), but the single processor can run instructions on separate cores at the same time, increasing overall processing speed for programs that support multithreading or other parallel computing techniques. For example, a processing system may include one or more multi-core processors configured to perform operations presented herein. In the embodiment shown in FIG. 3, processing system 302 includes DSP core 312A, DSP core 312B, and DSP core 312C. A DSP core can perform digital signal processing for various applications with better power efficiency than general processors. The quantity of DSP cores within processing system 302 can vary within examples. For instance, processing system 302 can include dozens of processing units (e.g., 24 DSP cores).

In some examples, DSP cores 312A-312C are uniform in configuration. Each DSP core 312A-312C may perform processing operations using similar parameters (e.g., processing speed, power consumption, and efficiency). Alternatively, DSP cores 312A-312C can include different types of DSPs in other examples. For example, one or more DSP cores may be a high performance core while one or more DSP cores are configured for power efficiency. In addition, DSP cores 312A-312C can be collocated on the same PCB in some examples.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing system 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 (or one or more DSP cores 312A-312C) to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing system 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing system 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing system 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, and/or one or more light emitting diodes (LEDs). Additionally or alternatively, computing system 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing system 300 may include Ethernet, BLUETOOTH®, and Wifi interfaces.

In some embodiments, one or more instances of computing system 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing system 300 may enable the performance of embodiments described herein, including efficient assignment and processing of sensor data.

Figure 4:
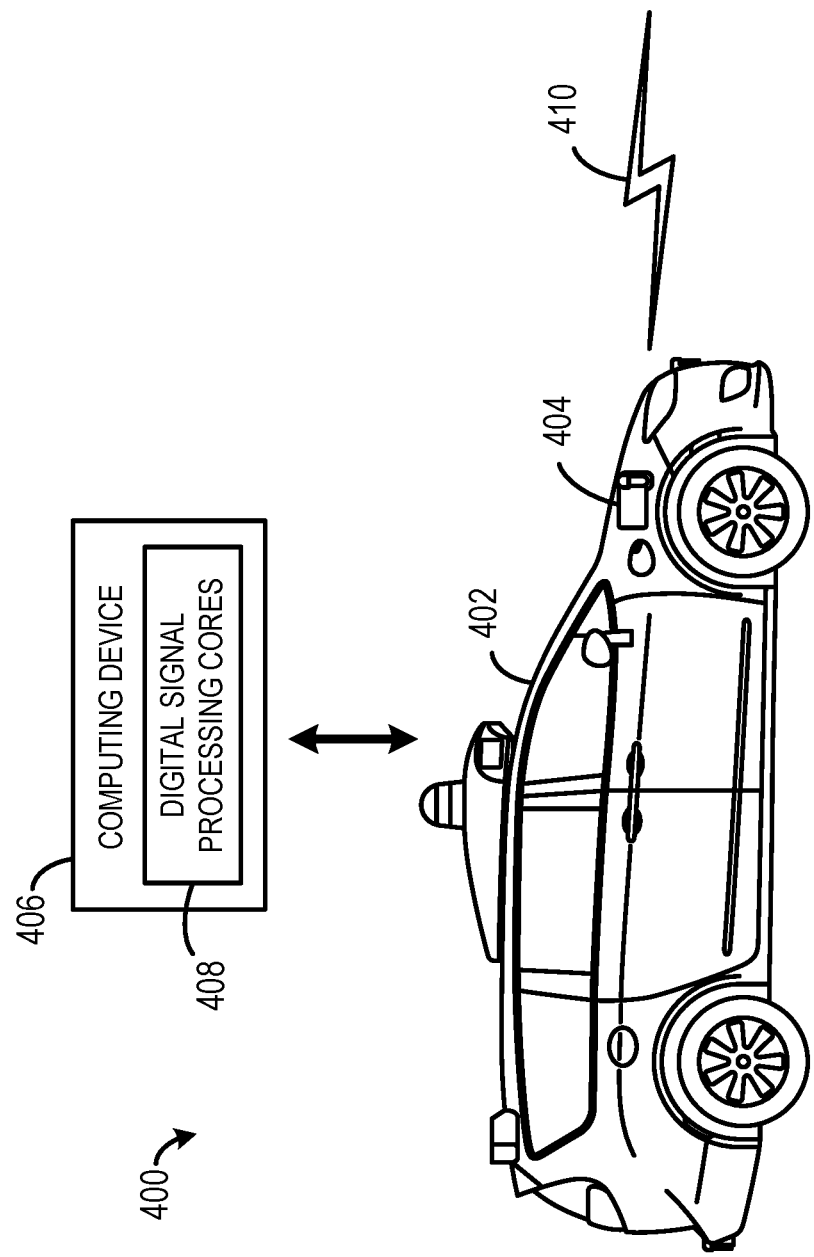
FIG. 4 illustrates a system for processing sensor data efficiently across multiple processing cores, according to one or more example embodiments.

FIG. 4 illustrates system 400 that can schedule and process sensor data efficiently across multiple processing cores. As shown, system 400 includes vehicle 402 equipped with sensor 404 and computing device 406 configured with DSP cores 408. In other embodiments, system 400 may include other components in other arrangements.

System 400 may represent an example system configured to perform scheduling and processing operations described herein. For example, sensor 404 may capture sensor data 410 of the nearby environment as vehicle 402 navigates a path. In the embodiment shown in FIG. 4, sensor data 410 represents measurements of an area in front of vehicle 402. A vehicle navigation system may use measurements from sensor data 410 to understand the environment and determine navigation strategies that ensure safe travel for vehicle 402. For example, sensor data 410 may include measurements that indicate the positions, orientations, and other parameters (e.g., movements) of objects, road elements, and other features in the environment relative to vehicle 402. In other embodiments, one or more vehicle sensors may capture sensor data representing measurements of other areas relative to vehicle 402.

Computing device 406 may be configured to obtain sensor data 410 from sensor 404 and subsequently process sensor data 410. For instance, computing device 406 may periodically receive sensor data 410 from one or more sensors (e.g., sensor 404). Alternatively, computing device 406 may receive sets of data continuously from one or more sensors (e.g., sensor 404). As such, sensor data 410 may represent one set representing measurements for a particular duration. In the embodiment shown in FIG. 4, computing device 406 is shown positioned remotely from vehicle 402. In other examples, computing device 406 is coupled to vehicle 402. For instance, computing device 406 can be part of the vehicle navigation system of vehicle 402.

In some embodiments, computing device 406 may receive sensor data 410 from sensor 404 and responsively determine that sensor data 410 includes multiple stages (e.g., a first stage and a second stage) arranged in a pipeline configuration. As such, computing device 406 may further virtually arrange DSP cores 408 into one or more segments based on the quantity of stages within sensor data 410. For example, computing device 406 may virtually arrange DSP cores 408 into a first segment and a second segment when sensor data 410 includes a first stage and a second stage. As such, each segment may include one or more DSP cores 408 arranged in a linear order. The linear order can be used to enable sequential initial processing by DSP cores within each segment. As noted above, DSP cores 408 can be prearranged into segments while setting up computing device 406 to process sensor data 410.

In some examples, sensor data 410 can correspond to a radar data pipeline that applies two FFTs. As a result, the first stage applies the first FFT to the entire data cube and then the second stage applies the second FFT to the entire output of the first stage. The data can be partitioned within each stage (e.g., each core in the first segment computes FFTs of a different part of the incoming data cube (e.g., sensor data 410)). Processing of the second stage by a second segment may require the completion of the first stage. For example, sensor data 410 can be visualized as a two-dimensional (2D) grid with the first FFT applicable in one direction (e.g., along columns). Computing device 406 can partition sensor data 410 within the first stage since columns do not interact with one another within the 2D grid. Then, the second FFT can be performed along rows of the 2D grid. In particular, the first FFT is completed prior to the second FFT because each row cuts across all columns. Once the first FFT is complete, the rows are independent enabling the second stage to partition the data horizontally and parallelize the computation of the second FFT.

DSP cores within each segment may process stages as discussed above. For example, responsive to receiving an assignment of the first stage, DSP cores from the first segment are configured to initiate processing the first stage sequentially based on the linear order such that all DSP cores from the first segment process portions of the first stage in parallel. In particular, the first DSP core in the linear order initiates processing a portion of the first segment and also provides a signal (e.g., an interrupt) that triggers the second DSP core in the linear to wake up and start processing a different portion of the first stage. This wake up process is repeated across the DSP cores within the first segment until the end DSP core according to the linear order is processing a portion of the first stage, which can result in all the DSP cores within the first segment processing portions of the first stage in parallel. Once the first DSP core completes processing its portion, the first DSP core can provide another signal (e.g., a completion signal) to the second DSP core that signals the first DSP core has completed processing. When a core receives a completion interrupt, the interrupt indicates that all of the preceding cores have finished the parallel part of processing and these cores also optionally collated their share of the output. The current core may delay handling the completion interrupt until completing its parallel portion of the processing and collate its completed portion with the collated output from the other cores. At this point, the current core can trigger the completion interrupt of its successor (i.e., the next core in the linear arrangement), which enables the successor to have an indication that previous results are done and have been optionally collated together. In addition, the end DSP core within the first segment can be configured to provide a start signal to the first DSP core within the second segment that triggers these DSP cores to perform a similar processing technique to generate a second stage output based on the second stage.

Each segment of DSP cores may perform a similar processing operation, which enables all stages of sensor data 410 to be processed. The end DSP core within the final segment can provide a completion signal to computing device 406 to signal that sensor data 410 has been processed completely. In some instances, some of the segments may have already started processing subsequent sensor data acquired by a vehicle sensor (e.g., sensor 404).

Computing device 406 may receive the completion signal from the end DSP core from the final segment and responsively use each stage output to determine an overall output that represents the environment as originally captured by sensor 404. For example, computing device 406 may use each stage output to generate a 2D map representative of the environment of vehicle 402. Computing device 406 may continuously perform similar sensor processing techniques using sensor data from vehicle sensors to update the 2D map as vehicle 402 navigates different locations.

Figure 5A:
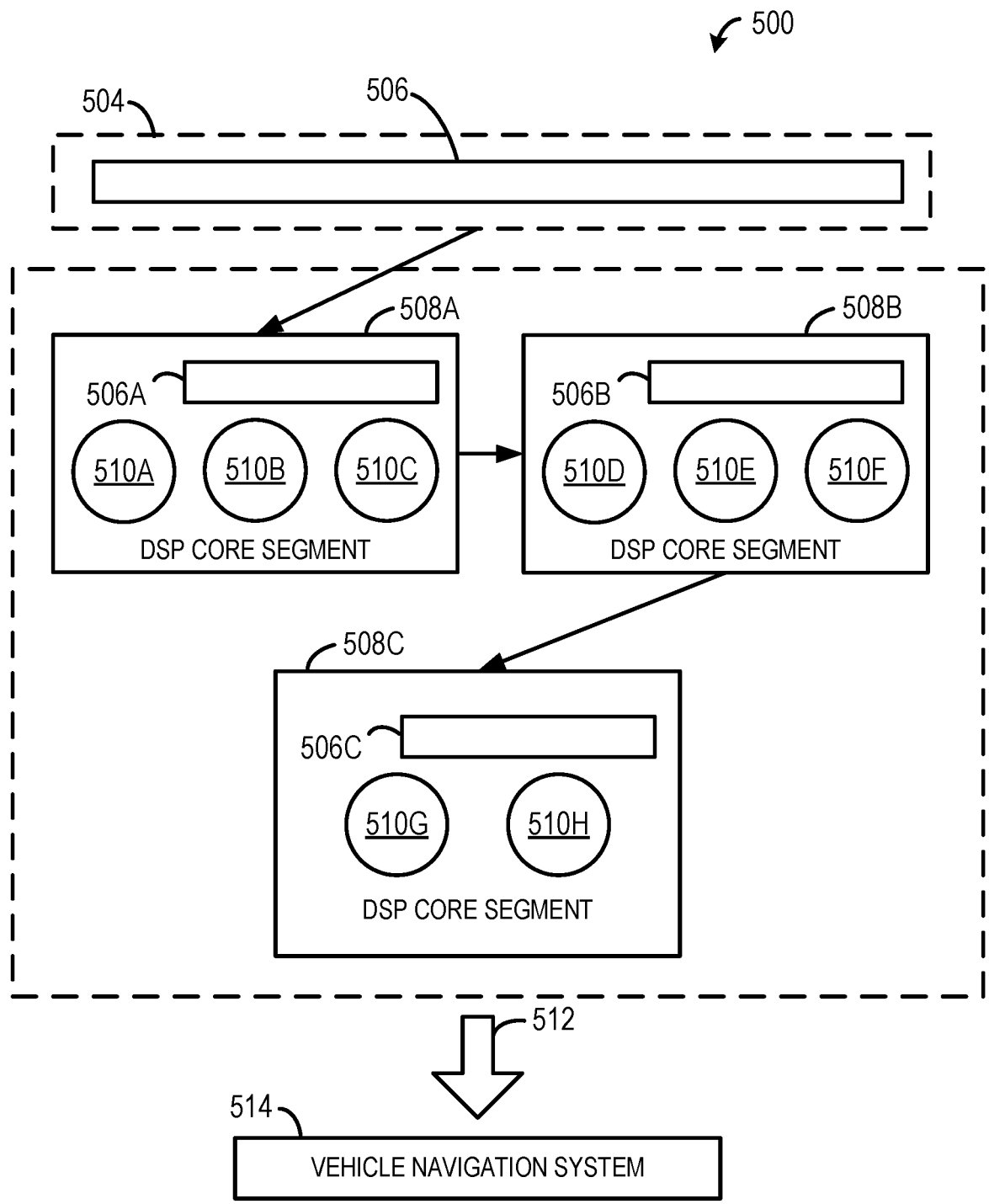
FIG. 5A illustrates another system for scheduling workloads across multiple processing cores, according to one or more example embodiments.

FIG. 5A illustrates system 500 for scheduling and processing workloads across multiple DSP cores. In the example embodiment shown in FIG. 5A, system 500 is shown with computing device 502, vehicle sensor 504, and vehicle navigation system 514. In other embodiments, system 500 may include more or fewer components in other arrangements. For instance, computing device 502 and vehicle navigation system 514 may operate as part of a single system located onboard a vehicle. In some implementations, system 500 may be implemented as system 400 shown in FIG. 4.

System 500 may be used to efficiently distribute and process data jobs in real-time via multiple DSP cores 510A-510H associated with computing device 502. For instance, system 500 may be used to process a series of sensor data (e.g., sensor data pipeline 506) obtained from vehicle sensor 504, which may be various types of sensors within examples. For example, vehicle sensor 504 may be a radar unit, a LIDAR module, a camera, sonar, or another type of sensor or combination of sensors. As such, vehicle sensor 504 may continuously (or periodically) capture sensor data during vehicle navigation, which can be processed to understand the vehicle's environment and enable autonomous operations.

Computing device 502 may have DSP cores 510A-510H virtually arranged into different segments (i.e., DSP core segments 508A, 508B, 508C) to enable each segment to process a different stage of incoming sensor data (e.g., sensor data pipeline 506). For example, sensor data pipeline 506 may be radar measurements with different stages 506A-506C corresponding to range and/or Doppler FFTs. In other instances, the different stages 506A-506C represent other partitions of sensor data pipeline 506. As such, processing sensor data pipeline 506 as well as other subsequent sensor data pipelines may require processing stages in order in some cases. Particularly, subsequent stages (e.g., stages 506B, 506C) may depend on completing the processing of stage 506A first.

Each DSP core segment 508A-508C includes DSP cores arranged in a linear arrangement forming a contiguous range of cores that can enable processing stages efficiently using interrupts. For example, DSP core segment 508A has DSP core 510A positioned first in the linear arrangement, DSP core 510B next as the successor to DSP core 510A, and DSP core 510C as the last core within DSP core segment 508A and the successor to DSP core 510B. The quantity of DSP cores within each segment can differ in other embodiments.

Computing device 502 can use DSP core segments 508A-508C to process sensor data pipeline 506 efficiently by having each of DSP core segment 508A-508C process different portions of each stage 506A-506C in parallel. The processing technique within each DSP core segment 508A-508C may involve using two external callbacks on DSP cores, which can be triggered by separate interrupts. In particular, one interrupt may be used to signal the start of a computation and one interrupt may be used to signal completion of a computation. To start a computation, a host (e.g., computing device 502 or a processing unit within computing device 502) may write the address of the job configuration corresponding to sensor data pipeline 506 to a register of the first core of the first segment and trigger a first interrupt (i.e., a start interrupt that initiates processing by the segment). After the initial core receives the first interrupt, each core within DSP core segment can wake up its successor prior to initiating processing of its slice of the workload (i.e., stage 506A of sensor data pipeline 506) except for the last core of the segment, which lacks a successor. The processing of each stage may be performed in a callback that can run in parallel on all cores within a DSP core segment. When the first core completes processing its portion of the stage, the first core can invoke its completion callback before triggering a second interrupt (i.e., the completion interrupt) for the next DSP core (DSP core 510B). The next DSP core can then invoke its completion callback before triggering the completion interrupt of its successor DSP core and so on, until the completion interrupt of the last core of the segment is triggered.

The above processing technique can increase efficiency by having the processing callbacks run concurrently while the completion callbacks run sequentially. Processing callbacks concurrently can be useful for dividing and processing large workloads, such as large amounts of sensor data from vehicle sensors. For example, the ability to process callbacks concurrently among DSP cores 510A-510H can enable computing device 502 to process and generate an output based on sensor data pipeline 506. In addition, executing completion callbacks sequentially can be useful for collating results across DSP cores within each segment. The last core of the segment will trigger the first interrupt of the next segment until there are no more remaining segments. When a following segment no longer exists, the last core of the last segment may notify the host (e.g., the computing system). If an error occurs anywhere, processing will stop and the host will be notified.

In some examples, processing will stop when a DSP core encounters an error, such as a bad input, bad memory, or a failure of a sensor or network device. The core that encountered the failure will interrupt the host and stop processing subsequent requests. The host is configured to address the failure, which may involve retrieving debugging information and resetting the chip that includes the DSP cores (e.g., DSP cores 510-A-510H). After a failure, any work being done downstream from the failing DSP core may continue normally despite the failure while any upstream work will stop at the failing DSP core.

Each DSP core 510A-510H may include a special register that indicates its global state. When the special register has a value of zero ("0"), the global state indicates that the particular DSP core has not launched yet. When the special register has a value of one, the DSP core is ready to process requests and negative values indicate that processing has stopped with an error code.

In the example embodiment shown in FIG. 5A, computing device 502 (or a host within computing device 502) may write the address of configuration corresponding to sensor data pipeline 506 (or specifically the address corresponding to stage 506A) to a register of DSP core 510A (i.e., the first core from DSP core segment 508A) and also provide a first interrupt at DSP core 510A. Responsive to the first interrupt, DSP core 510A may be configured to wake up the next core in the segment (i.e., DSP core 510B) via an interrupt prior to processing a portion of stage 506A. Based on receiving the interrupt from DSP core 510A, DSP core 510B may be configured to perform a similar operation and wake up DSP core 510C via an interrupt prior to processing a different slice of stage 506A. Because DSP core 510C is the last core within DSP core segment 508A, DSP core 510C can be configured to start processing a remaining portion of stage 506A upon receiving the interrupt from DSP core 510B. By performing the above technique, DSP cores 510A-510C can process stage 506A via parallel processing until completion. When DSP core 510A completes processing its portion of stage 506A, DSP core 510A may invoke a completion callback before providing a completion interrupt to DSP core 510B. DSP core 510B can invoke its completion callback upon completing its portion of stage 506A before triggering the completion interrupt of DSP core 510C. DSP core 510C may invoke a completion callback and provide a first stage output that can be used in combination with other stage outputs by vehicle navigation system 514

DSP core segment 508B and DSP core segment 508C can perform similar techniques to process stages 506B and 506C, respectively. In particular, DSP core 510C from DSP core segment 508A is configured to provide an interrupt to DSP core 510D from DSP core segment 508B that causes DSP core 510D to initiate processing stage 506B by DSP core segment 508B. Particularly, upon receiving the interrupt from DSP core 510C, DSP core 510D may initiate processing techniques described herein by waking up DSP core 510E prior to processing a portion of stage 506B and so on. As a result, DSP core segment 508B may process stage 506B, which can depend on the completion of stage 506A. Similarly, DSP core 510F or another DSP core from DSP core segment 508B may trigger processing of stage 506C by DSP core segment 508C by providing an interrupt signal to DSP core 510G. DSP core segment 508C may use techniques above to generate a stage output corresponding to stage 506C.

Using the above techniques, stages 506A-506C may be processed by DSP core segments 508A-508C in a linear order based on sensor data pipeline 506. The outputs from each DSP core within DSP core segments 508A, 508B, 508C can be collated within each segment. The output representing the collocated results can then be collocated from all of the segments 508A-508C to form processing output 512. As a result, processing output 512 may represent processed measurements of the environment based on sensor data pipeline 506 obtained from vehicle sensor 504 and can be provided by computing device 502 to vehicle navigation system 514 for use to perform one or more autonomous operations.

In addition, although the above example embodiment depicts a vehicle application, the segment configuration mechanism associated with system 500 can support a wide range of use cases, such as pipelined jobs (e.g., a sequence of non-overlapping segments), sequential jobs (e.g., a sequence of potentially overlapping segments), hybrid jobs (sequential jobs pipelined with other jobs) and eternal jobs (where the last core retriggers the first one), as well as combinations thereof.

Figure 5B:
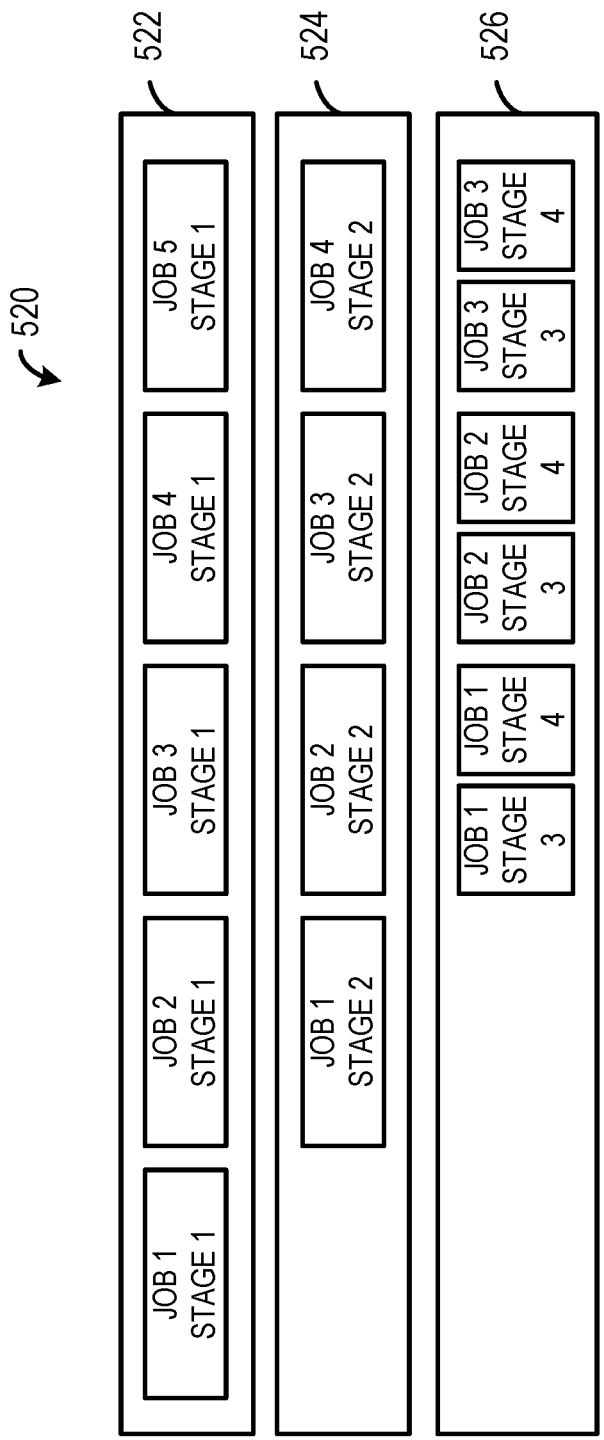
FIG. 5B illustrates a system for processing workloads across multiple processing cores, according to one or more example embodiments.

FIG. 5B illustrates a system for scheduling and processing workloads across multiple processing cores, according to one or more example embodiments. In the embodiment depicted in FIG. 5B, system 520 represents a processing system that includes processing units (e.g., DSP cores) that can be arranged into first segment 522, second segment 524, and third segment 526 as shown. Particularly, each segment may include one or more processing units configured to execute operations, such as sensor data processing. For example, system 520 may correspond to computing devices shown in FIG. 5A.

System 520 may be used to schedule and process various types of workloads, such as sensor data received from vehicle sensors. In the embodiment shown in FIG. 5B, system 520 may process different jobs with each job having different stages. Each job may represent a signal processing pipeline (e.g., sensor data from vehicle sensors) that can be partitioned into stages for parallel processing across cores.

A host (e.g., a DSP core or another processing unit) may initially write the address of the first pipeline configuration (i.e., Job 1) to a register of one or more cores of first segment 522. For instance, the host may write the address to the register of a first core within first segment 522. Responsive to receiving the address of Job 1, cores may process Stage 1 of Job 1 in parallel using the interrupt techniques described herein. Similarly, cores within second segment 524 may process Stage 2 of Job 1 after receiving an indication of the completion of processing of Stage 1 of Job 1 from first segment 522. In addition, cores from third segment 526 may process Stage 3 and Stage 4 of Job 1 after receiving an indication that second segment 524 completed processing Stage 2 of Job 1. As shown, subsequent stages of each job may build upon the output from prior stages within the job.

In addition, segments can also start processing new jobs after completing processing a given stage from a prior job. For example, cores from first segment 522 may initiate processing Stage 1 of Job 2 after completing the processing of Stage 1 of Job 1. Similarly, cores from second segment 524 may be configured to process Stage 2 of Job 2 in response to cores from first segment 522 completing Stage 1 of Job 2. By extension, cores from third segment 526 may process Stage 3 and 4 of Job 2 in response to cores from second segment 524 completing Stage 2 of Job 2. The above technique can be used as new jobs are input to system 520 for processing, such as Jobs 3, 4, and so on.

Figure 6:
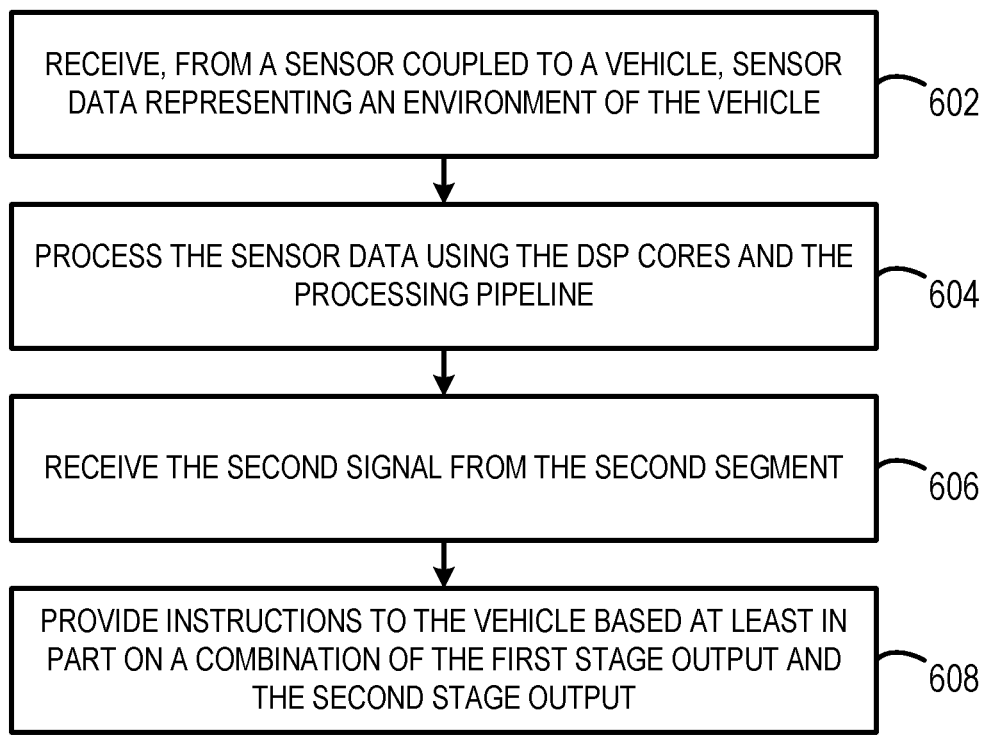
FIG. 6 is a flow chart of a method, according to one or more example embodiments.

FIG. 6 is a flowchart of a method. Method 600 represents an example method that may include one or more operations, functions, or actions, as depicted by one or more of blocks 602, 604, 606, and 608, each of which may be carried out by any of the systems shown in FIGS. 1-5, among other possible systems.

Those skilled in the art will understand that the flowcharts described herein illustrates functionality and operation of certain implementations of the present disclosure. In this regard, each block of the flowchart may represent a module, segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrently or in reverse order, depending on the functionality involved, as would be understood by those reasonably skilled in the art. In examples, a computing system may cause a radar system to perform one or more blocks of method 600.

At block 602, method 600 involves receiving, at a computing system and from a sensor coupled to a vehicle, sensor data representing an environment of the vehicle. The computing system includes a plurality of digital signal processing (DSP) cores. For example, the computing system may be implemented as computing system 300 depicted in FIG. 3.

The computing system may receive sensor data from various types of sensor systems. For instance, the computing system may receive sensor data from a vehicle radar system. In other examples, the computing system may receive LIDAR data, camera data, motion information, or another type of data. In further examples, the sensor data may represent data from a combination of sensors. For instance, the sensor data may represent a combination of radar measurements and LIDAR measurements.

The DSP cores may be virtually arranged based on the sensor data received for processing. For instance, a processing pipeline for the sensor data can be partitioned into multiple stages, the DSP cores may be divided into a quantity of segments that matches the quantity of stages. As an example, when the processing pipeline for the sensor data includes a first stage and a second stage, the DSP cores may be virtually arranged into a first segment and a second segment such that each segment includes one or more DSP cores arranged in a linear order. In other examples, the quantity of stages in the sensor data and the quantity of segments virtually generated may differ. For instance, the processing pipeline may include less segments than the quantity of stages. As a result, one or more segments may perform processing for multiple stages.

At block 604, method 600 involves processing the sensor data using the DSP cores and the processing pipeline. In some embodiments, the DSP cores from the first segment are configured to: (i) initiate processing the first stage sequentially based on the linear order until all DSP cores are processing portions of the first stage in parallel, (ii) optionally collate outputs from each DSP core to produce a first stage output, and (iii) provide a first signal (e.g., a start signal) to the second segment based on producing the first stage output. In addition, responsive to receiving the first signal from the first segment, DSP cores from the second segment may be configured to: (i) initiate processing the second stage sequentially based on the linear order until all DSP cores are processing portions of the second stage in parallel, (ii) optionally collate outputs from each DSP core to produce a second stage output, and (iii) provide a second signal based on producing the second stage output. The above techniques can be extended for additional segments of cores when additional segments are used to process further stages of sensor data.

In some examples, assigning the first stage of the processing pipeline to the first segment may involve writing a first address corresponding to the first stage of the processing pipeline to a register of a first DSP core from the first segment. For instance, the first DSP core from the first segment may be configured to initiate processing the first stage sequentially based on the linear order in response to obtaining the first address via the register. In some instances, the process may also involve writing a second address corresponding to the second stage of the processing pipeline to a register of a first DSP core from the second segment. The segments (e.g., the first segment and the second segment) may communicate with each other. The first DSP core from the second segment may be configured to initiate processing the second stage sequentially based on the linear order in response to receiving the first signal (e.g., a start signal) from the first segment. An end DSP core from the first segment can be configured to provide the first signal (the start signal) to the first DSP core from the second segment.

At block 606, method 600 involves receiving, at the computing system, the second signal from the second segment. The second signal may signal that all stages within the processing pipeline corresponding to the sensor data have been completed by the corresponding segments.

At block 608, method 600 involves providing instructions to the vehicle based at least in part on a combination of the first stage output and the second stage output responsive to receiving the second completion signal. In some embodiments, the computing system may determine a two dimensional (2D) map representative of the environment based on the first stage output and the second stage output. The computing system may provide instructions to the vehicle based at least in part on the 2D map representative of the environment. In some instances, the instructions may be control instructions provided to a vehicle control system for execution. The computing system can be the control system of the vehicle in some examples. In other examples, the computing system may be another computing device located onboard the vehicle. In yet other examples, the computing system can be a processing unit (e.g., server) positioned remotely from the vehicle and provide the instructions via a wireless connection to the vehicle.

In some example embodiments, the computing system may also supplement the first stage output and the second stage output with other sensor data when determining navigation strategies for the vehicle. For example, the computing system may receive sensor data from a second sensor and control the vehicle further based on the sensor data from the second sensor. In some examples, the computing system may utilize a similar process to extract information from the sensor obtained via the second sensor.

Other examples may involve dividing sensor data into more stages (e.g., three or more stages) and also virtually grouping DSP cores into a different quantity of stages that may match the quantity of stages.

In some embodiments, method 600 may further involve receiving, from the sensor coupled to the vehicle, subsequent sensor data representing the environment of the vehicle and processing the subsequent sensor data using the plurality of DSP cores. For instance, DSP cores from the first segment may be configured to: initiate processing a first stage of the subsequent sensor data sequentially based on the linear order until all DSP cores are processing portions of the first stage in parallel, (ii) collate outputs from each DSP core to produce a first stage subsequent output, and (iii) provide a third completion signal to the second segment based on producing the first stage subsequent output. In addition, responsive to receiving the third signal from the first segment, DSP cores from the second segment may be configured to: (i) based on producing the second stage output for the sensor data, initiate processing a second stage of the subsequent sensor data sequentially based on the linear order until all DSP cores are processing portions of the second stage in parallel, (ii) collate outputs from each DSP core to produce a second stage subsequent output, and (iii) provide a fourth signal based on producing the second stage subsequent output.

Figure 7:
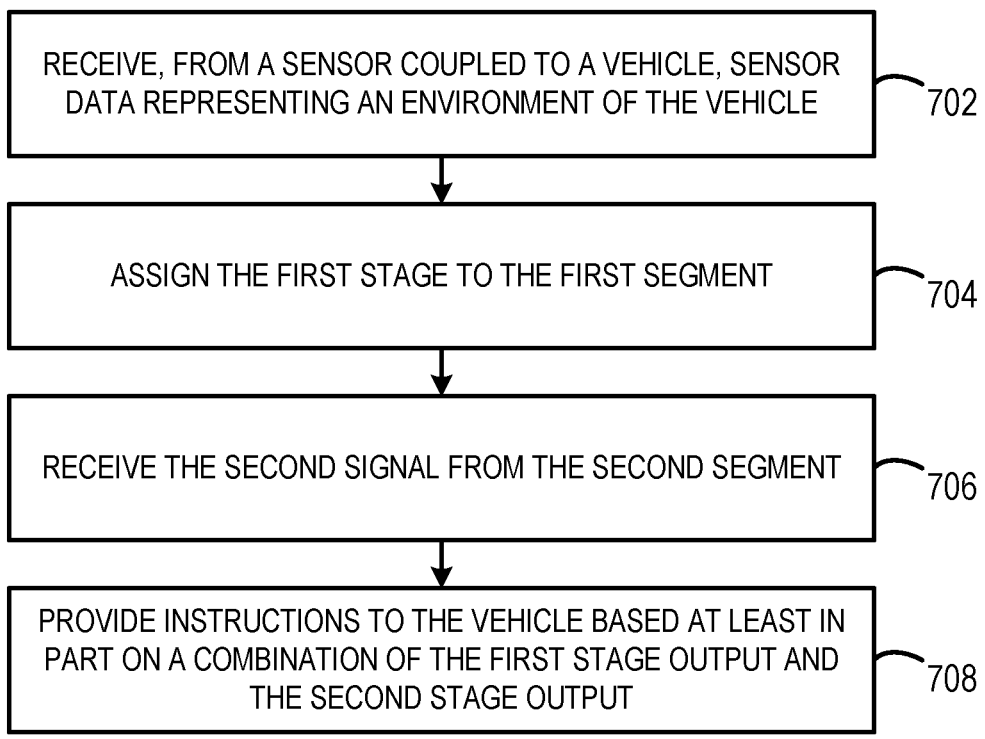
FIG. 7 is another flow chart of a method, according to one or more example embodiments.

FIG. 7 illustrates another example method. Method 700 represents an example method that may include one or more operations, functions, or actions, as depicted by one or more of blocks 702, 704, and 706, each of which may be carried out by any of the systems shown in FIGS. 1-5, among other possible systems.

At block 702, method 700 involves receiving, at a computing system and from a sensor coupled to a vehicle, sensor data representing an environment of the vehicle. The computing system includes DSP cores virtually arranged into a first segment and a second segment based on a type of sensor providing the sensor data to the computing. Each segment may include DSP cores arranged in a linear order.

For example, when the computing system is processing incoming sensor data from the vehicle radar system, the DSP cores may be virtually arranged into segments according to a processing pipeline based on the configuration of radar measurements. By pre-arranging the DSP cores into segments, sensor processing can be accelerated and require less resources and time to complete. The first stage of the processing pipeline may involve a range Fourier fast transform (FFT) and the second stage of the processing pipeline may involve a Doppler FFT.

At block 704, method 700 involves assigning, by the computing system, the first stage to the first segment. Responsive to receiving an assignment of the first stage, DSP cores from the first segment are configured to: (i) initiate processing the first stage sequentially based on the linear order until all DSP cores are processing portions of the first stage in parallel, (ii) collate outputs from each DSP core to produce a first stage output, and (iii) provide a first signal to the second segment based on producing the first stage output. In addition, responsive to receiving the first signal from the first segment, DSP cores from the second segment are configured to: (i) initiate processing the second stage sequentially based on the linear order until all DSP cores are processing portions of the second stage in parallel, (ii) collate outputs from each DSP core to produce a second stage output, and (iii) provide a second signal based on producing the second stage output.

At block 706, method 700 involves receiving, at the computing system, the second signal from the second segment. The second signal may signal that processing of the sensor data according to the processing pipeline is complete.

At block 708, method 700 involves providing instructions to the vehicle based at least in part on a combination of the first stage output and the second stage output. In some examples, the instructions may be control instructions that can assist with autonomous operation of the vehicle. The vehicle control system may use the instructions to control the vehicle based at least in part on a combination of the first stage output and the second stage output. For example, the computing system (or another navigation system on the vehicle) may perform a control strategy responsive to receiving the second completion signal.

In some examples, a vehicle control system may determine control instructions based on one or more stage outputs. In addition, navigation strategies can be adjusted as DSP cores process newly obtained sensor data.

Figure 8:
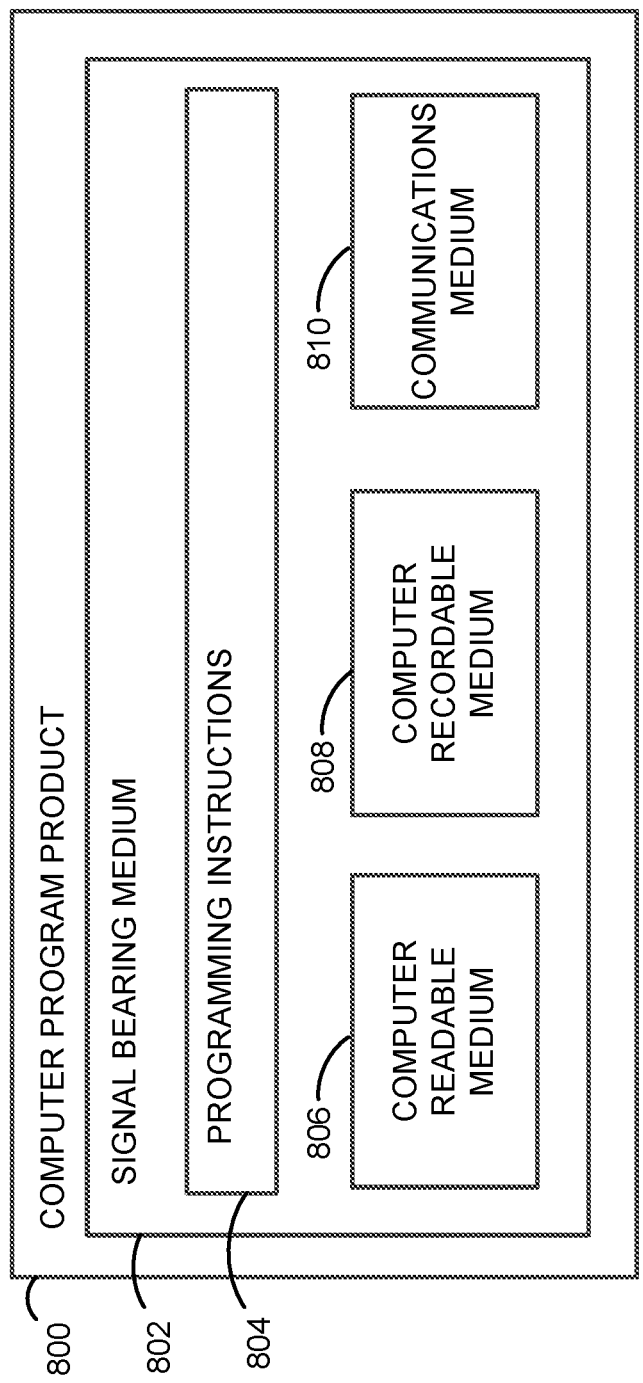
FIG. 8 illustrates a schematic diagram of a computer program, according to one or more example embodiments.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-6. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 shown in FIG. 1, computing system 300 shown in FIG. 3, or another device may be configured to provide various operations, functions, or actions in response to the programming instructions 804 conveyed to the computer system 112 by one or more of the computer readable medium 806, the computer recordable medium 808, and/or the communications medium 810.

The non-transitory computer readable medium could also be distributed among multiple data storage elements, which could be remotely located from each other. The computing device that executes some or all of the stored instructions could be a vehicle, such as vehicle 100 illustrated in FIGS. 2A-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
receiving, at a computing system and from a sensor coupled to a vehicle, sensor data representing an environment of the vehicle, wherein the computing system is located onboard the vehicle and includes a plurality of digital signal processing (DSP) cores, wherein a processing pipeline for the sensor data includes a first stage and a second stage, and wherein the plurality of DSP cores are virtually arranged into a first segment and a second segment based on a type of the sensor such that each segment includes a set of DSP cores arranged in a linear order;
processing, by the computing system, the sensor data using the plurality of DSP cores and the processing pipeline, wherein DSP cores from the first segment are configured to:
  (i) initiate processing the first stage of the sensor data sequentially based on the linear order until at least two DSP cores from the first segment are processing portions of the first stage in parallel,
  (ii) collate outputs from each DSP core from the first segment to produce a first stage output, and
  (iii) provide a first signal to the second segment based on producing the first stage output, and
wherein responsive to receiving the first signal from the first segment, DSP cores from the second segment are configured to:
  (i) initiate processing the second stage of the sensor data sequentially based on the linear order until at least two DSP cores from the second segment are processing portions of the second stage in parallel,
  (ii) collate outputs from each DSP core from the second segment to produce a second stage output, and
  (iii) provide a second signal based on producing the second stage output;
receiving, at the computing system, the second signal from the second segment; and
responsive to receiving the second signal, controlling the vehicle based at least in part on a combination of the first stage output and the second stage output.

2. The method of claim 1, wherein receiving sensor data representing the environment of the vehicle comprises:
receiving sensor data from a vehicle radar system, wherein the first stage of the processing pipeline involves a range Fourier transform and the second stage of the processing pipeline involves a Doppler Fourier transform.

3. The method of claim 1, further comprising:
determining a two dimensional (2D) map representative of the environment based on the first stage output and the second stage output; and
wherein controlling the vehicle based at least in part on the combination of the first stage output and the second stage output comprises:
controlling the vehicle based on the 2D map representative of the environment.

4. The method of claim 1, wherein processing, by the computing system, the sensor data using the plurality of DSP cores and the processing pipeline comprises:
writing a first address corresponding to the first stage to a register of a first DSP core from the first segment, wherein the first DSP core from the first segment is configured to initiate processing the first stage sequentially based on the linear order in response to obtaining the first address via the register.

5. The method of claim 4, wherein an end DSP core from the first segment is configured to provide the first signal to the first DSP core from the second segment.

6. The method of claim 5, wherein the end DSP core from the first segment is further configured to provide an indication of the first stage output to one or more DSP cores from the second segment.

7. The method of claim 1, further comprising:
receiving sensor data from a second sensor, wherein the second sensor is a different type of sensor than the sensor; and
wherein providing instructions to the vehicle is further based on the sensor data from the second sensor.

8. The method of claim 1, further comprising:
receiving, from the sensor coupled to the vehicle, subsequent sensor data representing the environment of the vehicle; and
processing the subsequent sensor data using the plurality of DSP cores and the processing pipeline, wherein DSP cores from the first segment are configured to:
  (i) initiate processing a first stage of the subsequent sensor data sequentially based on the linear order until at least two DSP cores from the first segment are processing portions of the first stage of the subsequent sensor data in parallel,
  (ii) collate outputs from each DSP core from the first segment to produce a first stage subsequent output, and
  (iii) provide a third signal to the second segment based on producing the first stage subsequent output, and
wherein responsive to receiving the third signal from the first segment, DSP cores from the second segment are configured to:
  (i) initiate processing a second stage of the subsequent sensor data sequentially based on the linear order until at least two DSP cores from the second segment are processing portions of the second stage of the subsequent sensor data in parallel,
  (ii) collate outputs from each DSP core from the second segment to produce a second stage subsequent output, and
  (iii) provide a fourth signal based on producing the second stage subsequent output.

9. The method of claim 8, further comprising:
receiving the fourth signal from the second segment; and
responsive to receiving the fourth signal, controlling the vehicle based at least in part on a combination of the first stage subsequent output and the second stage subsequent output.

10. A system comprising:
a computing device having a plurality of digital signal processing (DSP) cores that are virtually arranged into a first segment and a second segment based on a type of a sensor such that each segment includes a set of DSP cores arranged in a linear order, wherein the computing device is configured to:
receive, from the sensor coupled to a vehicle, sensor data representing an environment of the vehicle, wherein a processing pipeline for the sensor data includes a first stage and a second stage;
process the sensor data using the plurality of DSP cores and the processing pipeline, wherein DSP cores from the first segment are configured to:

(i) initiate processing the first stage of the sensor data sequentially based on the linear order until at least two DSP cores from the first segment are processing portions of the first stage in parallel, (ii) collate outputs from each DSP core from the first segment to produce a first stage output, and (iii) provide a first signal to the second segment based on producing the first stage output, and wherein responsive to receiving the first signal from the first segment, DSP cores from the second segment are configured to:

(i) initiate processing the second stage of the sensor data sequentially based on the linear order until at least two DSP cores from the second segment are processing portions of the second stage in parallel, (ii) collate outputs from each DSP core from the second segment to produce a second stage output, and (iii) provide a second signal based on producing the second stage output;

receive the second signal from the second segment; and responsive to receiving the second signal, control the vehicle based at least in part on a combination of the first stage output and the second stage output.

11. The system of claim 10, wherein the sensor is a vehicle radar system.

12. The system of claim 11, wherein the computing device is further configured to:

determine a two dimensional (2D) map representative of the environment based on the first stage output and the second stage output; and control the vehicle based on the 2D map representative of the environment.

13. The system of claim 10, wherein the computing device is further configured to:

write a first address corresponding to the first stage to a register of a first DSP core from the first segment, wherein the first DSP core from the first segment is configured to initiate processing the first stage sequentially based on the linear order in response to obtaining the first address via the register.

14. The system of claim 13, wherein an end DSP core from the first segment is configured to provide the first signal to the first DSP core from the second segment.

15. The system of claim 14, wherein the end DSP core from the first segment is further configured to provide the first stage output to one or more DSP cores from the second segment.

16. The system of claim 10, wherein the computing device is further configured to:

receive, from the sensor coupled to the vehicle, subsequent sensor data representing the environment of the vehicle; and process the subsequent sensor data using the plurality of DSP cores and the processing pipeline, wherein DSP cores from the first segment are configured to:

(i) based on producing the first stage output for the sensor data, initiate processing on a first stage of the subsequent sensor data sequentially based on the linear order until at least two DSP cores from the first segment are processing portions of the first stage of the subsequent sensor data in parallel, (ii) collate outputs from each DSP core from the first segment to produce a first stage subsequent output, and (iii) provide a third signal to the second segment based on producing the first stage subsequent output, and wherein responsive to receiving the third signal from the first segment, DSP cores from the second segment are configured to:

(i) based on producing the second stage output for the sensor data, initiate processing on a second stage of the subsequent sensor data sequentially based on the linear order until at least two DSP cores from the second segment are processing portions of the second stage of the subsequent sensor data in parallel, (ii) collate outputs from each DSP core from the second segment to produce a second stage subsequent output, and (iii) provide a fourth signal based on producing the second stage subsequent output.

17. A non-transitory computer readable medium configured to store instructions, that when executed by a computing system comprising a plurality of digital signal processing (DSP) cores, causes the computing system to perform operations comprising:

receiving, from a sensor coupled to a vehicle, sensor data representing an environment of the vehicle, wherein a processing pipeline for the sensor data includes a first stage and a second stage, and wherein the plurality of DSP cores are virtually arranged into a first segment and a second segment based on a type of the sensor such that each segment includes a set of DSP cores arranged in a linear order;

processing the sensor data using the plurality of DSP cores and the processing pipeline, wherein DSP cores from the first segment are configured to:

(i) initiate processing the first stage of the sensor data sequentially based on the linear order until at least two DSP cores from the first segment are processing portions of the first stage in parallel, (ii) collate outputs from each DSP core from the first segment to produce a first stage output, and (iii) provide a first signal to the second segment based on producing the first stage output, and wherein responsive to receiving the first signal from the first segment, DSP cores from the second segment are configured to:

(i) initiate processing the second stage of the sensor data sequentially based on the linear order until at least two DSP cores from the second segment are processing portions of the second stage in parallel, (ii) collate outputs from each DSP core from the second segment to produce a second stage output, and (iii) provide a second signal based on producing the second stage output;

receiving the second signal from the second segment; and responsive to receiving the second signal, controlling the vehicle based at least in part on a combination of the first stage output and the second stage output.

18. The non-transitory computer readable medium of claim 17, further comprising:

determining a two dimensional (2D) map representative of the environment based on the first stage output and the second stage output; and controlling the vehicle based on the 2D map representative of the environment.

19. The non-transitory computer readable medium of claim 17, further comprising:

writing a first address corresponding to the first stage to a register of a first DSP core from the first segment, wherein the first DSP core from the first segment is configured to initiate processing the first stage sequentially based on the linear order in response to obtaining the first address via the register.

20. The non-transitory computer readable medium of claim 17, further comprising:
receiving, from the sensor coupled to the vehicle, subsequent sensor data representing the environment of the vehicle; and
processing the subsequent sensor data using the plurality of DSP cores and the processing pipeline,
wherein DSP cores from the first segment are configured to:
(i) initiate processing a first stage of the subsequent sensor data sequentially based on the linear order until at least two DSP cores from the first segment are processing portions of the first stage of the subsequent sensor data in parallel,
(ii) collate outputs from each DSP core from the first segment to produce a first stage subsequent output, and
(iii) provide a third signal to the second segment based on producing the first stage subsequent output, and
wherein responsive to receiving the third signal from the first segment, DSP cores from the second segment are configured to:
(i) initiate processing a second stage of the subsequent sensor data sequentially based on the linear order until at least two DSP cores from the second segment are processing portions of the second stage in parallel,
(ii) collate outputs from each DSP core from the second segment to produce a second stage subsequent output, and
(iii) provide a fourth signal based on producing the second stage subsequent output.

* * * * *